United States Patent [19]

Wilkins

[11] Patent Number: 4,763,981
[45] Date of Patent: Aug. 16, 1988

[54] ULTIMATE LOW-LOSS ELECTRO-OPTICAL CABLE

[75] Inventor: George A. Wilkins, Kailua, Hi.

[73] Assignee: The United States of America as represented by the Secretary of the Navy, Washington, D.C.

[21] Appl. No.: 239,253

[22] Filed: Mar. 2, 1981

[51] Int. Cl.$^4$ .............................................. G02B 6/44
[52] U.S. Cl. ................................................. 350/96.23
[58] Field of Search ........................... 350/96.23, 96.24

[56] References Cited

U.S. PATENT DOCUMENTS

| | | | |
|---|---|---|---|
| 4,037,923 | 7/1977 | Beal | 350/96 |
| 4,038,489 | 7/1977 | Stenson et al. | 174/70 |
| 4,076,382 | 2/1978 | Oestreich . | |
| 4,097,119 | 6/1978 | Kumamaru et al. | 350/96.23 |
| 4,143,942 | 3/1979 | Anderson | 350/96.23 |
| 4,156,104 | 5/1979 | Mondello . | |
| 4,160,872 | 7/1979 | Lundberg | 350/96.23 |
| 4,169,657 | 10/1979 | Bedard | 350/96.23 |
| 4,199,224 | 4/1980 | Oestreich | 350/96.23 |
| 4,239,336 | 12/1980 | Parfree et al. . | |
| 4,278,835 | 7/1981 | Jackson . | |

Primary Examiner—William L. Sikes
Assistant Examiner—Robert E. Wise
Attorney, Agent, or Firm—E. F. Johnston; Thomas Glenn Keough

[57] ABSTRACT

An undersea cable reliably transmits optical control signals and data. At least one optical fiber is axially disposed in an otherwise solid electrical conductor which transmits power the length of the cable. A concentrically disposed dielectric insulating layer prevents shorting with the surrounding seawater and a load-bearing annulus coaxially contains the other elements to also protect them from environmental abuses. During deployment or towing, the load-bearing annulus shares part of the load with the solid electrical conductor and a coaxially disposed sleeve encloses all of the other elements for preventing a leaching action of seawater and to defocus externally originating, concentrated forces.

4 Claims, 3 Drawing Sheets

| CABLE COMPONENT | SPECIFIC GRAVITY | CROSS SECTION $A_i$ (CM²) | WEIGHT (KGF/KM) | S (1%) (KGF) |
|---|---|---|---|---|
| OPTICAL FIBER (1) | 2.20 | 0.00012 | 0.027 | -------- |
| SILICONE BUFFER (1) | 1.20 | 0.00073 | 0.088 | -------- |
| *POLYESTER BUFFER (1) | 1.25 | 0.00111 | 0.139 | -------- |
| VOID-FILLING GEL | 1.14 | 0.0168 | 1.917 | -------- |
| COPPER CONDUCTOR | 8.89 | $(\pi/4)(D_3^2 - 0.0225)$ | $890 A_c$ | $4500 A_c$ |
| DIELECTRIC | 0.92 | $(\pi/4)(D_4^2 - D_3^2)$ | $92 A_d$ | -------- |
| KEVLAR-49 | 1.45 | $0.565(\pi/4)(D_5^2 - D_4^2)$ | $145 A_K$ | $11,250 A_K$ |
| EPOXY MATRIX | 1.19 | $0.435(\pi/4)(D_5^2 - D_4^2)$ | $119 A_e$ | -------- |
| POLYURETHANE JACKET | 1.14 | $(\pi/4)(D_6^2 - D_5^2)$ $= 0.2\pi(D_5 + 0.2)$ | $114 A_p$ | -------- |
| SEAWATER BUOYANCY GAIN | $1.032_5$ | $(\pi/4)(D_5 + 0.4)^2$ | $-103.5 A$ | -------- |
| TOTALS | | | $W_W$ | $S(1\%)$ |
| * OPTIONAL BUFFER, AND NOT CONSIDERED IN THIS DESIGN. | | | | |

*FIG.2b*

\* ARE DESIGN VARIABLES

| PARAMETER | VALUE | DEFINITION |
|---|---|---|
| $L$ | 60 | CABLE LENGTH (KM). |
| $V_0$ | * | ONSHORE SUPPLY VOLTAGE (VDC). |
| $W$ | * | POWER DELIVERED TO ARRAY (WATTS). |
| $I$ | * | CURRENT INSHORE CABLE (AMPS). |
| $R_C$ | * | CABLE RESISTANCE (OHM/KM). |
| $R_L$ | * | ARRAY LOAD RESISTANCE (OHMS) $R_L = R_C \cdot L$. |
| $R_S$ | 0 | RESISTANCE (OHMS) OF THE SEAWATER RETURN; CONSIDERED NEGLIGIBLE. |
| $D_1$ | --- | O.D. OF THE BUFFERED FIBER; EITHER 0.033- OR 0.050 CM. |
| $D_2$ | 0.15 | CONDUCTOR I.D. (CM). |
| $D_3$ | * | CONDUCTOR O.D. (CM). |
| $D_4$ | * | DIELECTRIC O.D. (CM). |
| $D_5$ | * | O.D. OF LOADBEARING SECTION (CM). |
| $D_6$ | * | O.D. OF THE CABLE JACKET (CM). $D_6 = D_5 + 0.4$(CM). |
| $S(1\%)$ | * | TENSILE LOAD FOR A CABLE STRAIN OF 1.0% (KGF). |
| $S_C$ | 4,500 | CONDUCTOR ULTIMATE TENSILE STRESS; AT 1% STRAIN (KGF/CM$^2$). |
| $S_K$ | 11,250 | KEVLAR-49 TENSILE STRESS; AT 1% STRAIN (KGF/CM$^2$). (STRESS/STRAIN IS LINEAR TO 2.5% AT BREAK.) |
| $W_W$ | * | CABLE INWATER WEIGHT (KGF/KM). |
| $\rho$ | * | CABLE SPECIFIC GRAVITY. |
| $F$ | 2.0 | SAFETY FACTOR; 5.5-KM DEPLOYMENT. $F = S(1\%)/5.5 W_W$. |

_FIG.2a_

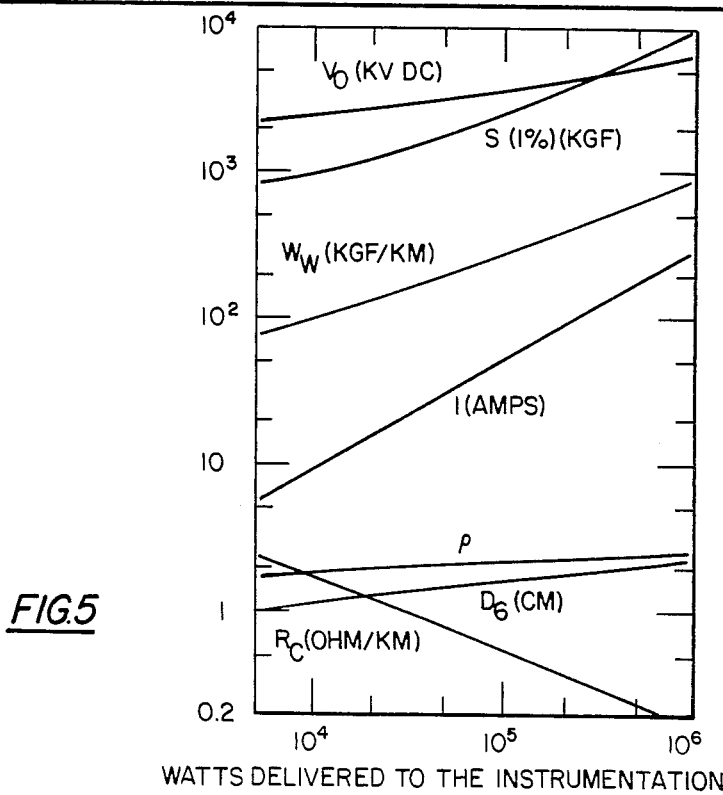

_FIG.5_

WATTS DELIVERED TO THE INSTRUMENTATION

ULTIMATE LOW-LOSS ELECTRO-OPTICAL CABLE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to undersea cables and more particularly to undersea cables for simultaneously transmitting power by a metallic conductor and data and control signals by optical fibers.

The improved data transmitting capabilities of optical fibers have greatly increased their use as manufacturing techniques have improved performance and reduced cost. Multi-mode and single-mode fibers readily lend themselves for inclusion in undersea cables where weight and size constraints, among others, further limit the desirability of metallic conductors.

One design disclosed in U.S. Pat. No. 4,037,923 and entitled "Optical Guides with Compressible Cellular Material" by Richard Ernest Beal has a number of optical fibers radially disposed about an axial load-bearing member. A cushioning material was interposed and a protective sheath helped prevent damage and assured that the fibers could transmit data with some measure of reliability. Derek William Stenson et al in U.S. Pat. & Trademark No. 4,038,489 provided a central tensile member and a coaxially disposed tensile sheath which interposed a number of dielectric optical waveguides. An outer sheath serves to protect the rest of the elements against corrosion. The tensile members bear the load and the tensile sheath and outer sheath protect the waveguides during the laying of the cable. Further protection from externally originating mechanical stresses is provided for by the optical cable of Ulrich Oestreich as described in U.S. Pat. and Trademark Office No. 4,076,382. A spring steel core is covered by a polyurethane layer which sandwiches a layer of optical transmission elements between successive layers of plastic and polyvinylchloride. Inner and outer armor layers fabricated from a prestretched aromatic polyamide assure the necessary protection of the data carrying elements during deployment and retrieval.

The optical fiber cable of Hiroyuki Kumamaru et al in U.S. Pat. and Trademark No. 4,097,119 has a cable including a strengthening member cushioning optical fiber reinforcing layers to avoid the problems normally associated with bending highly fused silica fibers during deployment. The cable resists breaking the optical fibers as the cable is twisted and pulled during deployment so that the fibers' data transmitting capabilities are not compromised. Gene S. Anderson in U.S. Pat. and Trademark Office No. 4,143,942 shows a further improvement over the state-of-the-art; tensile strength members, fiber optical elements and coaxial sheaths are held together by tape to facilitate being stripped back and exposing the inner elements of the cable while also functioning as a heat barrier. The U.S. Pat. and Trademark Office No. 4,169,657 by Kenneth L. Bedard entitled "Laminated Strength Members for Fiber Optic Cable" sought to increase reliability by including a coaxial prestretched strength member about an axially running optical fiber. Prestressing the strength member sought to prevent cracking or breaking of the fiber when longitudinal strains became excessive. A later design by Ulrich Oestreich disclosed in U.S. Pat. and Trademark Office No. 4,199,224 was a number of optical cables disposed in a number of chambers about a coaxial load-bearing member so that they are movable radially to protect the optical conductors from tensile, compressional and flexural stresses.

The submarine cable for optical communications designed by Richard C. Mondello in U.S. Pat. No. and Trademark Office No. 4,156,104 was specifically designed to reduce the mechanical stresses on a submarine cable which occur during laying and recovery. Particular attention was given to providing hermetic protection of the optical fibers against moisture since it was learned that the combination of moisture and stress on an optical fiber quickly leads to structural failure. In addition, this cable included an efficient d.c. path for powering a number of optical repeaters and was fabricated to be sufficiently strong to withstand the deployment stresses and years of operation at sea. An axially extending tensile load-bearing member is surrounded by a number of optical fibers embedded in an elastomeric portion. Another group of load-bearing members is radially outwardly disposed and a d.c. conducting path is formed directly over the second load-bearing members. Outwardly of this a dielectric and a vinyl jacket provides for electrical insulation and protection of the cable, respectively. Tensile loads apparently are borne by the axial and the radially outwardly disposed members; however, it is not apparent if any consideration has been given as to how these loads have been balanced between the two.

The consequent torsional strains created during deployment and retrieval may effect the structural integrity of the embedded optical fibers since their separation from the axis of the cable must necessarily magnify the torsional motions and, as a result, will magnify the compressive and tensile strains on the fibers. Furthermore, the dielectric material carried radially outwardly from the load-bearing members is more vulnerable to abrasions and punctures leading to failure of the d.c. power system. The outermost jacket, while affording some degree of protection, may be inadequate to provide a sufficient safeguard for protecting the dielectric material from breakdown.

One of the latest developments is shown in U.S. Pat. and Trademark Office No. 4,239,336. This Optical Communication Cable has information carrying fibers inside of an electrical conductor which, in turn, are carried inside of a dielectric layer and a tubular strength member. It appears that the strength member is a wire rope affair that affects the cable's weight and flexibility. These properties are critical during cable laying since experience has demonstrated that damage is likely to occur, if at all, while the cable is being deployed.

The several cable designs discussed make use of the advantages of fiber optic data transmitting cables and all have advantages and answer a long felt need to one degree or another. Most of the cables described do not provide for transmitting the electrical power along with the data transmitting optical fibers. Some locate the fibers at a distance from the cable axis and, consequently, subject the fibers to magnified strains when the cables are flexed or bent. One design that does include a d.c. power transmission capability leaves the dielectric insulation somewhat exposed to abrasions and punctures and increases the chances of shorting out the d.c.

power system. The other d.c. power-fiber data cable apparently could be unduly weighty or cumbersome for some applications.

Thus, there is a continuing need in the state-of-the-art for an optical data transmitting undersea cable including its own power conductor that does not subject the data carrying optical fibers to excessive strains during deployment and retrieval, that protects the insulating dielectric layer from abrasions and punctures, that allows for the sharing of the tensile load by the load-bearing and armor layer along with the d.c. conductor and which is configured to cushion the elements during deployment.

SUMMARY OF THE INVENTION

The present invention is directed to providing a deep ocean cable for transmitting power and data. Means axially extend for optically transmitting control and data signals and coaxially disposed about the optically transmitting means, an electric power transmitting means provides power for repeaters and distant monitoring equipments. A dielectrically insulating means is coaxially carried about the electrical power transmitting means to prevent electrical breakdown or shorting out with the surrounding seawater. An armoring and tensile load-bearing means is carried about the dielectrically insulating means to protect its contained elements and to serve as the primary load-bearing member imposed by the weight of the cable itself. In the latter regard, the electrically transmitting means shares the load to assure support of the cable. Lastly, a radially outwardly disposed protecting means prevents the leaching action of seawater and defocuses externally originating concentrated forces.

A prime object is to provide an improved undersea cable having additional capabilities.

Still another object is to provide a deep ocean cable for transmitting d.c. power and optical data.

Yet another object is to provide an improved deep ocean cable having an axially extending optical data transmitting means encased in a d.c. power conductor.

Yet another object is to prevent a deep ocean cable arranged in successive coaxial layers to assure reduced stresses and strains during deployment and retrieval.

Still another object is to provide a deep ocean cable having its d.c. conductor encased in a dielectric insulating layer.

Yet another object is to provide a deep ocean cable having the primary tensile load-bearing member encasing optical data transmitting means and d.c. power means, and a dielectric means for armoring them from the ambient effects.

Yet a further object is to provide for an undersea cable having a final protective sheath for defocusing externally originating concentrated forces and for preventing the leaching action of seawater to internal elements.

Still another object of the invention is to provide for a coaxially layered undersea cable having an axial optical data carrying means, a radially outwardly disposed d.c. Power conducting means, a radially outwardly disposed dielectric layer, a radially outwardly disposed tensile load-bearing and armoring member and a protecting sheath.

Still a further object of the invention is to provide a deep ocean cable having a deployment stress safety factor of at least two, a cable specific gravity of at least one point five and an armor layer to protect the cable against abrasions and fish bites.

These and other objects of the invention will become more readily apparent from the ensuing specification and claims when taken with the drawings.

BRIEF DESCRIPTION OF THE DRAWINGS

FIG. 2 depicts a table showing cable design parameters to assure that safety factor and specific gravity requirements are met.

FIG. 5 shows a variation of cable parameters with delivered power for 'minimized' values of $D_6$. Other design constraints include: $L = 60$ kilometers, $F = 2.0$, $\rho$ is greater than or equal to 1.5, deployment depth is 5.5 kilometers and safety factor F is set at 2.0 at this depth.

DESCRIPTION OF THE PREFERRED EMBODIMENT

Figure 1:
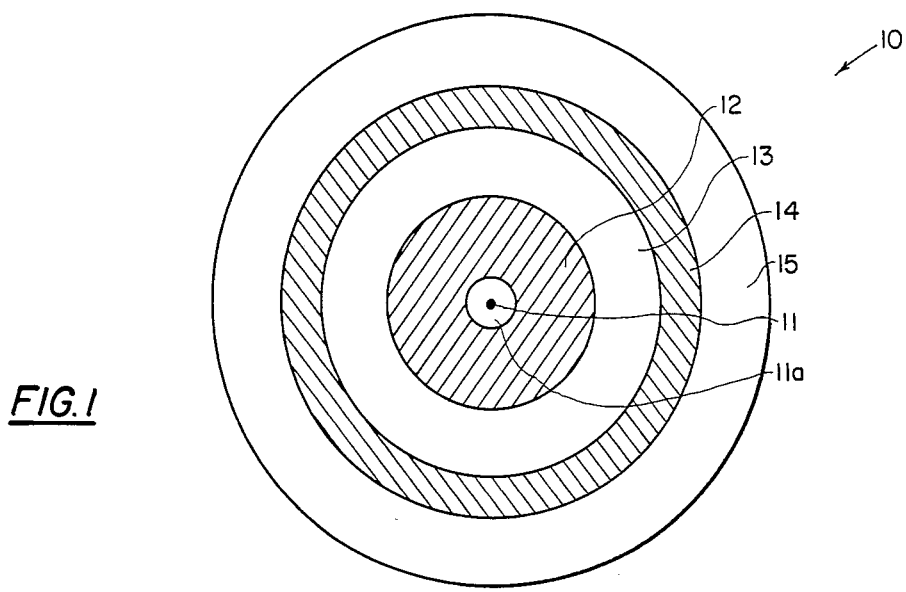
FIG. 1 is a cross-sectional view of a preferred embodiment of a deep ocean cable fabricated in accordance with the disclosed inventive concept having a minimum outer diameter for the performance constraints noted herein.

Referring now to the drawings and in particular to FIG. 1, a deep ocean cable 10 has an optical section 11 made up of one or more optical fibers contained in a non-setting gel 11a such as that commercially marketed under the designation RTV. The optical fiber and gel are contained within a solid copper or aluminum conductor 12 which, in turn, is entirely covered by a dielectric insulating layer 13. A load-bearing member 14 completely encases the optical fiber, electrical conductor and dielectric insulating layer and functions as the primary load-bearing member as well as armoring the other elements from the effects of abrasions, blows, fish bites and the like. Finally, an outer jacket 15 covers the other elements to prevent leaching by the ambient seawater and to defocus externally originating concentrated forces. Details regarding the afore-identified elements will be elaborated on below.

The constraints which epitomized the design of this cable are far more demanding than those expected of contemporary designs. The cable has a length of approximately 60 kilometers and is deployed to a maximum ocean depth of 5.5 kilometers. It has a static safety factor of at least 2.0. (In-water-weight as the cable hangs vertically to a depth of 5.5 kilometers, must be less than or equal to 50 percent of the cable strength.) Here, strength is defined as that load which causes a one percent cable strain. Electrical power is transmitted to the array as a d.c. current through the single conductor and uses a seawater return. This power is delivered to a matched load, that is, the load resistance of the array is equal to that of the cable plus its seawater return (the last term is assumed to be negligibly small).

The fiber optic telemetry is used for both data and control signals and the 60 kilometer cable has no electrooptical repeaters. Although a variety of designs could be selected, a typical cable design allows at least three optical fibers, each to be used in the full-duplex telemetry mode at 1.3 microns and command signals at 1.55 microns. The bandwidth-length product for this fiber at 1.3 microns is 10 gigabits-kilometer per second. The cable's operating life is at least 10 years and its optical sections are protected against abrasion and fish bite by layers 12, 13, 14 and 15. The cable's overall diameter is to be minimized (it must have the safety factor of at least 2.0; its specific gravity is at least 1.5). Voltage stresses in the dielectric insulating layer are not greater than 19,700 volts per centimeters (50 volts per mil). The voltage stress is the normal design upper limit for a heavily worked undersea cable, such as the ones used for towing deep sea sensors. However, since this cable will be stressed only during deployment and should have a rather benign and uneventful life afterwards, the 19,700 volts per centimeter figure allows for a deliberate margin of safety. The level of voltage stress allows array support power to be increased even after installation by as much as a factor of two if the final instrumentation and equipments prove to be more power hungry than expected.

The stress safety factor of two is necessary to anticipate the stresses created during deployment of the shore cable. In conventional cable this design factor is normally much less and can dangerously approach unity. However, a small stress safety factor requires that cable laying be meticulously coordinated and timed so that transverse drag acts to partially support the cable during its long fall to the ocean floor and, as a consequence, the cable laying operation is very susceptible to sudden weather changes or shipboard accidents.

Since the cable of this inventive concept seeks to avoid such a design compromise, a safety factor of at least two is considered essential. In addition, this cable is armored along its entire length. This armor, layer 14, is a special lightweight material elaborated on below which also serves as the primary load-bearing structure. The optical data and control transmitting means 11 can be one or more optical fibers located within a cylindrical tube or bore formed in the cable electrical power transmitting means 12. The fiber is buffered in a nonsetting gel which converts external anisotropic stresses to a more isotropic (that is hydraulic) form.

The fiber(s) either most likely will be a single mode fiber or a graded index fiber designed for minimum attenuation and dispersion (less than or equal to 0.5 dB per kilometer) at 1.3 microns and 1.5 microns. In this design concept the buffered optical fiber can have a thick coating of silicon rubber and additionally given a coating of a polyester elastomer, such as nylon or hytrel, to about a 500 microns outer diameter.

During the drawing/buffering process, the optical fiber (optical fibers if more than one is desired) is subjected to at least a one percent proof strain. It should be possible to increase this strain level to at least 1.5 percent and possibly 2.0 percent with at least some of the commercially available fibers. Even the lowest of the strain values matches the one percent strain level used here to define cable strength. The design or working cable load will require only half of that strength (and strain).

Although FIG. 1 shows only one optical fiber 11, the cross section of the optical enclosure in the electrical power transmitting means 12 can be made large enough to contain three fibers buffered with silicon and the elastomer and at least six if they are buffered only with the 330 micron outer diameter silicon rubber. Therefore, the cable's bandwidth is a function not only of each individual fiber's bandwidth but also of the number of fibers placed into the cable.

Although fibers having continuous lengths of 60 kilometers may not be technically feasible at the present, shorter sections of 5 to 8 kilometers can be fused and spliced to form the required length. Splices are made presently in multi-mode fibers with much less than 0.1 dB excess loss per splice and splices with 0.1 dB loss are reasonable for single mode fibers made with extreme care. It is equally important that the splices' strength be higher than the proof strength of the fiber and that the fibers' residual strengths be retained by immediate reapplication of a flaw-free buffer coating. This last requirement is too often given a low priority in fiber splicing.

The electrical power transmitting means 12 is a hollow tube of electrical grade copper or aluminum preferably work hardened to increase its range of axial elasticity. The tube's inner diameter is 0.15 centimeters and its outer diameter is a variable of the cable design. The copper tube is manufactured by extrusion in much the same way that copper tube is built. A side of the tube is slit open as it emerges from the extrusion die. Later, during cable assembly, this opening will be enlarged. One or more buffered fibers are inserted along with a void filling gel. The tube is squeezed shut and the slit is permanently closed by welding, for example, using a laser.

An optional method calls for the longitudinal shaping by rolling an elongate strip so that it has a nearly closed tube configuration. The buffered optical fibers are inserted and the remaining voids are filled with a gel. Next the tube shape is closed by further rolling and it is welded. Other fabrication procedures are adaptable to place the fibers within a closed tube and may be relied upon within the scope of this inventive concept.

Dielectric insulating means 13 is a tube-like cylinder of standard high density polyethylene or polyallomer of the type commonly used in the extrusion of the dielectric spacer for submarine coaxial cables. The inner and outer diameters of this annulus are both variables of the cable design and are set in accordance with the dimensions computed below. The tolerances for this annulus are defined by resistance and breakdown constraints and not by any requirements for telemetry attenuation and bandwidth. Therefore, this cable design has an advantage over conventional coaxial cables since it is not necessary to go to extreme lengths to form the dielectric's outer surface into a perfect concentric cylinder to avoid a slow, laborious and expensive shaving procedure.

The tensile load-bearing and armoring means 14 has, as its name implies, a dual role in the cable. First, it is the cable's dedicated tensile load-bearing section. An almost equally important role for this means is for it to function as an armor to guard the insulation against abrasion or penetration from fish bite. The tensile load-bearing and armoring means is made up of thousands of filaments of a material commercially marketed under the Trade designation of "KEVLAR-49". Filaments of this aromatic polyamide fiber have extremely high tensile strengths and greater resistance to elongation than steel. Typically, resin tensile strength of 525,000 lbs/in$^2$ (ASTM 2343). An unimpregnated twisted yarn has a 400,000 lb/in$^2$ strength (ASTM D2256). These filaments are contained in a matrix of thermosetting resin. This approach has been used extensively and successfully in small, undersea, optical and electrooptical cables. The KEVLAR filaments are served into the cable as a contrahelix with a very long lay length (for torque balance). The KEVLAR structure normally carries most of the cable's tensile load although the load fraction varies with the supply voltage and the size of the copper conductor. For example, consider the cable design of FIG. 1. The cross-sectional areas of copper and KEVLAR 49 are 0.319 and 0.127 cm², respectively. Their tensile strengths at 1 percent strain are 4500 and 11,250 kgf/cm², respectively. This is the ultimate strength for the copper, while the stress/strain curve for KEVLAR 49 is linear to break at 2.5 percent strain. At 1 percent strain, tensile loading will be evenly divided 1434 kgf each between these two cable sections.

The outer jacket 15 is a tough black polyurethane or other elastomer and is a standard material in heavy-worked undersea cables. It protects the other elements from the leaching action of seawater and it defocuses concentrated stresses caused by fish bites or rocky outcroppings. For convenience in the design of this cable, the jacket outer diameter is always 0.4 centimeters greater than that of the primary load-bearing section 14.

Referring to FIG. 2a of the drawings, terms used in the derivation of the design are given for convenience. The outer diameter of each buffered fiber in the control and data transmitting means 11 ranges from 0.033 centimeters for a silicon buffer to 0.05 centimeters if the fiber is buffered with both silicon and elastomer. To avoid crowding in microbending of the fibers, the inner diameter of the electrical power transmitting means 12 is 0.15 centimeters for all modifications in the design of the cable. In the design of the cable and, particularly with respect to the electrical power transmitting means 12, power delivery is made through a single cable conductor with the circuit completed by a seawater return. This requires very large electrode surfaces at both the array and shore ends of the cable (not shown to avoid cluttering the drawings). The resistance of the seawater path is negligible compared to that of the cable and load resistances. For maximum efficiency in power transfer the resistance load is considered equal to that of the cable plus the seawater return.

Thus, the supply voltage $V_o$ necessary to supply current I through cable length L, cable resistance $R_c$ and load resistance $R_L$ is:

$$V_o = I(R_c \cdot L + R_L) \quad (1)$$
$$= 2I \cdot R_c \cdot L$$

since $R_c \cdot L$ has been constrained to be equal to $R_L$.

The electrical power delivered through the cable to the remote instrumentation is:

$$W = I^2 \cdot R_L = I^2 R_c \cdot L$$

so that, $$I = (W/R_c \cdot L)^{\frac{1}{2}}$$

and, $$V_o = 2(W \cdot R_c \cdot L)^{\frac{1}{2}} \quad (2)$$

Selecting a conductor from electrical grade copper, its resistance is:

$$R_c = \frac{(1.724 \times 10^{-6} \text{ ohm-cm})(10^5 \text{ cm/km})}{(\pi/4)(D_3^2 - D_2^2) \text{ cm}^2}$$
$$= 0.2195/(D_3^2 - D_2^2) \text{ohm/km}$$

and, $$D_3 = \sqrt{\frac{0.2195}{R_c} + D_2^2} \text{ cm}$$

From Equation (2):

$$R_c = V_o^2/4W \cdot L$$

so that, $$D_3 = \sqrt{\frac{0.8781(W \cdot L)}{V_o^2} + D_2^2} \text{ cm} \quad (3)$$

In a coaxial configuration of this type, the voltage stress in the dielectric will be:

$$V_s = \frac{2V_o}{D_3 Ln(D_4/D_3)} \text{ volts/cm} \quad (4)$$

or, $$D_4 = D_3 \cdot \text{Exp}(2V_o/V_s \cdot D_3) \text{cm}$$

If Equations (3) and (4) are combined, the dielectric O.D. $D_4$ is expressed in terms of miscellaneous constants and the system variables $V_o$, $V_s$, W and L.

$$D_4 = \sqrt{\frac{0.8781 W \cdot L}{V_o^2} + D_2^2} \text{ Exp} \frac{2V_o/V_s}{\sqrt{\frac{0.8781 W \cdot L}{V_o^2} + D_2^2}} \text{ cm} \quad (5)$$

Equation (5) has a broad but definite minimum when plotted against $V_o$. That minimum shifts slowly to higher values of $V_o$ as W and/or L are increased. Details of this behavior will be elaborated on below.

A primary design consideration of this inventive concept is to minimize the cable's overall diameter $D_6$. However, even that constraint must be subordinated to the requirements that the deployment safety factor F must be equal to at least 2, and that the cable's specific gravity $\rho$ must be greater than or equal to 1.5. A predesign analysis must, therefore, take into consideration the loadbearing section and cable jacket, the tensile load-bearing and armoring means 14 and the protecting means 15, respectively.

The cable's tensile strength comes nearly entirely from the copper conductor and the KEVLAR-49 filaments. (Other components have orders of magnitude smaller tensile strengths, tensile moduli and/or cross sectional areas.) Considering the tensile strengths (already given at 1% strain) for these two cable components;

$$S(1\%) = (\pi/4)[S_c(D_3^2 - D_2^2) + S_k(D_5^2 - D_4^2)] \text{kgf.} \quad (6)$$

In equation (6), all terms except $D_5$ are either known or knowable, and the useful strength is calculated in terms of that parameter and the desired electrical characteristics. Where cable weight is concerned, all components and all values of D must be considered.

The in-water weight of the deep ocean cable is calculated by summing, part by part, its component weight, then subtracting the buoyancy gained by submersion in seawater. The elements of this weight are shown (in parametric form) in FIG. 2b. Cable strength elements are also listed there.

Note that the cable diameter unknowns have been reduced to $D_3$, $D_4$ and $D_5$ in FIG. 2b. The first two of these are initially determined through use of Equation (5). The calculation finds those values of $V_o$, $D_3$ and $D_4$ which give the desired power export to the array while minimizing $D_4$. This occurs at acceptable values of $V_o$ and I. But the minimum value for $D_6$ is not apparent since the purely physical F and $\rho$ constraints have not been considered. These values are determined by solving equation (5) for $D_3$ and $D_4$ versus $V_o$. A value of $V_o$ provides the means for which $D_4$ is a minimum. From equation (3) $R_c$ is computed and from equation (1) I's value is known.

For each value of $D_3$ and $D_4$ obtained, $D_5$ is varied to determine cable strength and in-water weight. Next, calculate F and $\rho$. Some greater value of $D_4$ minimizes $D_6$, while satisfying the additional requirements. This is because the solution is biased toward a smaller value of $D_3$ (larger $D_4$) by a resultant decrease in the specific gravity of the electrical section.

To repeat, the minimum acceptable value of $D_6 = D_5 + 0.4$ cm must obey the following constraints: $F = 2.0 = S(1\%)/5.5W_w$, $\rho \geq 1.5$, $D_5 \geq D_4$, and I, $V_o$ and $R_c$ are all acceptable for the instrumentation load, deployment distance, etc. Having $D_5 \geq D_4$ warns that the cable specific gravity may become so small that it may appear that the load-bearing structure is no longer needed to satisfy the F=2.0 requirement. However, this cannot be allowed to happen because the KEVLAR-49 annulus also is needed as a protective armor.

Modifications of the cable design outlined above are made to accommodate the telemetry bandwidth and power requirements. As an example, a cable can be fabricated which should allow telemetry up to 1000 megabits per second and DC power requirements of between 5 and 1000 kilowatts. Exact cable calculations are offered for DC power levels of 10, 50, 100 and 250 KW. The 250 to 1000 KW power range can be obtained by extrapolation from the values shown in the drawings.

Figure 3:
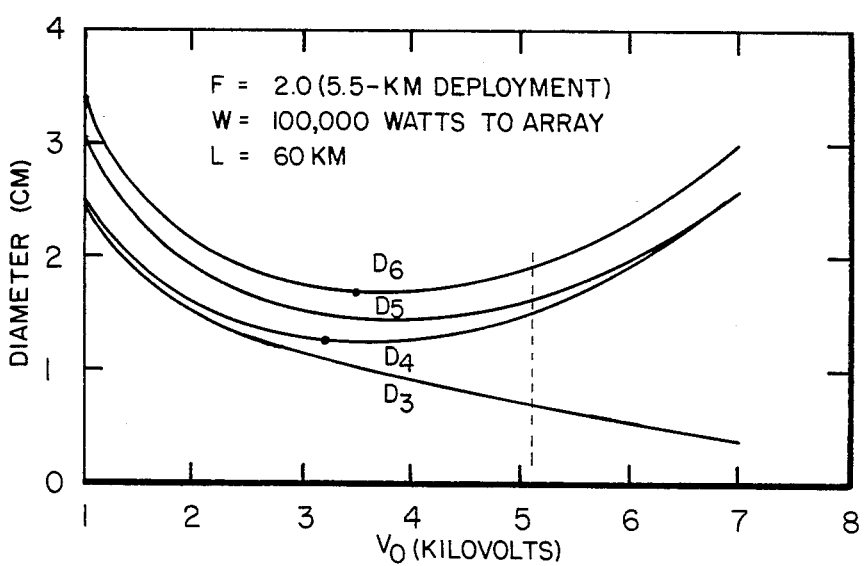
FIG. 3 is a graph depicting the effect of supply voltage on cable component diameters. To the right of the vertical dash line the cable specific gravity $\rho$ is equal to or less than 1.5. At $V_o = 7000$ volts, the load-bearing structure disappears ($D_5 = D_4$).

FIG. 3 provides a family of design solutions for the 100 KW cable shown and described with respect to the embodiment of FIG. 1. Component diameters $D_3$ through $D_6$ are plotted as functions of voltage, and all $D_6$ values satisfy the requirement F=2.0. Note that $D_6$ has a broad minimum over the range of 3000 to 4000 KV. The exact minimum occurs at 3600 volts (vs. 3350 volts for minimum $D_4$), but it is apparent that little penalty is exacted for operating anywhere within this region.

As $V_o$ becomes greater, $D_3$ steadily decreases and dielectric thickness $(D_4 - D_3)/2$ increases. This is due to the voltage stress requirement stated in equation (4). The consequence is that the electrical section's specific gravity becomes smaller, and less loadbearing section is needed. At about $V_o = 5050$ volts, the cable's specific gravity is equal to 1.5. As voltage increases, $\rho$ falls well below this lower design limit. In fact, it is possible to make a cable light enough to float in seawater.

When $V_o$ is equal to about 7000 volts, $D_5$ is equal to $D_4$; that is, the loadbearing structure is no longer needed to support a 5.5 km-deep cable with a safety factor of 2.0. Even if the "$\rho$" constraint allowed it, it is wise to stay well away from this voltage region since the armoring function provided by the KEVLAR-49 epoxy matrix is also needed.

All $V_o$ values in FIG. 3 appear otherwise reasonable. The line current at $V_o = 3600$ volts is 55.6 amps, and the cable's heat dissipation is less than 17 mw/cm.

Figure 4:
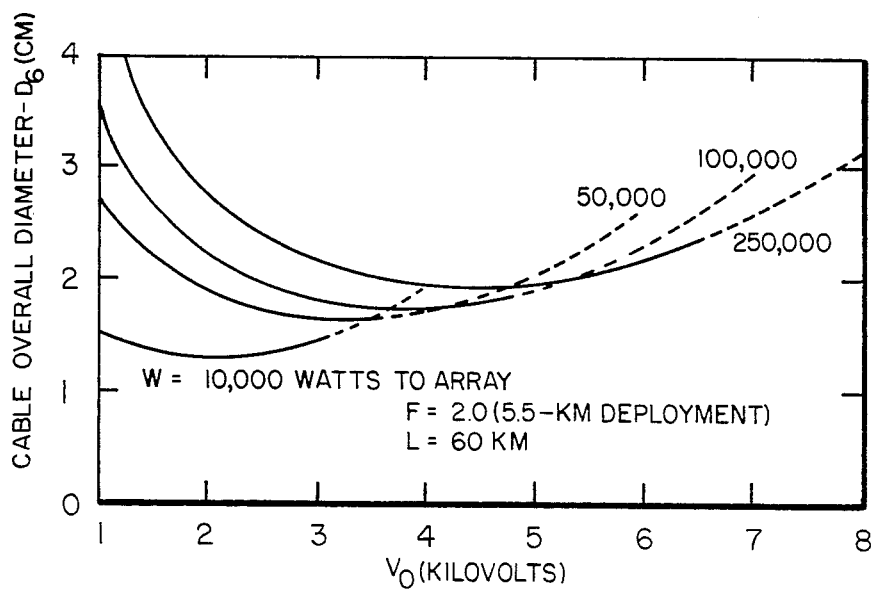
FIG. 4 is a graph depicting the effects of supply voltage and delivered power on cable diameter. The dashed lines are for cable specific gravity; $\rho$ is equal to or less than 1.5. Each plot terminates when the load-bearing structure disappears ($D_5 = D_4$).

FIG. 4 extends the design to include the range of 10 to 250 kilowatts of delivered power, and plots the "minimized" value of the parameter $D_6$. Only those solutions shown as solid lines are allowed. The dashed-like curves fail the $\rho \geq 1.5$ criterion, and each curve again terminates at a voltage where the loadbearing section disappears. Again, all solutions for W and $V_o$ appear reasonable and all cables have diameters of less than 2 cm. At a power of 250 kilowatts, heat dissipation is still less than 42 mw/cm.

FIG. 5 shows a plot developed for cable parameters in which the power delivered to the array W in kilowatts is equal to 10, 50, 100 and 250 kilowatts. The parameters are extrapolated to cover the 5 to 1000 kilowatt range. All of these parameters are plotted for minimized $D_6$. Over this power range, the largest cable outer diameter is equal to 2.5 cm at 1000 KW and is less than that of the smallest standard submarine cable which is approximately 3.18 cm in diameter.

Designs have been described for a family of cables capable of power support to $10^6$ watts and telemetry of 1000 megabits per second over a 60-km unrepeatered cable run. All have reasonable physical and electrical characteristics. None seriously stretch technology.

Each of these cables has a power-growth capability since the design is based on a conservative voltage stress of 19,700 V/cm (50 V/mil). With little or no danger, this voltage stress could increase by 50% allowing a 2.25-times increase in the power deliverable to the instrumentation.

The only potentially serious problem arising in fabrication of this cable is the design problems associated with insertion of the optical fiber into the conductor tube, the electrical power transmitting means 12. The conductor tubes could be extruded to have a longitudinal slit. At the fabrication point the slit could be widened, the optical fibers inserted one at a time, the remaining internal void filled with a non-setting gel, the slit pressed shut, and the seam welded with a high speed torch or laser. The tube should be held under tension as the fibers are inserted in order to ensure that the fibers are axially slack after assembly. The total heat penetration to the fibers should be small and the fabrication procedure is readily mechanized and automated since the seam need not be a hermetic seal and considerable degradation of the copper tube's strength is allowable.

KEVLAR 49 was chosen as the cable's primary load-bearing agent because it offers the best compromise among high strength, low ultimate strain, low specific gravity and the need to reduce bearing-stress concentrations on the surface of the dielectric. The specific characteristics of the material, a delberately conservative value chosen for ultimate tensile strength, are shown as follows. The KEVLAR 49 yarns are available in 380, 1420, and 7100 Denier (the weight (gmf) of 9000 meters of a filament, 1.42 Denier per filament), a filament diameter of 11.7 microns (0.00046"), a specific gravity of 1.45, an average ultimate tensile strength (unimpregnated twisted yarn tensile test ASTM D2256) of 28,100 kgf/cm$^2$ (400,000 psi), an ultimate strain of 2.5%

(stress/strain curve is linear to breaking strength), and a tensile modulus of 1,340,000 kgf/cm² (19,000,000 psi).

The load bearing structure for the cable design in FIG. 1 requires 24 KEVLAR yarns, each 7100 Denier with 5000 filaments per yarn. It is assumed that the influence of helix angle on the packing factor is negligible for a long-lay serving. This is a standard Denier. The number of yarns should match the number of storage bobbins available in a standard cabling machine.

Obviously, many modifications and variations of the present invention are possible in the light of the above teachings, and, it is therefore understood that within the scope of the disclosed inventive concept, the invention may be practiced otherwise than as specifically described.

What is claimed is:

1. A deep ocean cable having essentially no voids therein for transmitting power and data comprising:
   at least one optical fiber axially extending for optically transmitting control and data signals;
   a tube-shaped solid conductor having a coaxial bore sized to encase, isolate and hermetically seal the at least one optical fiber for electrically transmitting d.c. power through the deep ocean cable;
   a tube-like dielectric cylinder coaxially disposed about the tube-shaped solid conductor for encasing it and dielectrically insulating the tube-shaped solid conductor from the surrounding seawater;
   means coaxially disposed about the tube-like dielectric cylinder for armoring the at least one optical fiber, the tube-shaped solid conductor, and the tube-like dielectric cylinder and for tensiley bearing the load imposed by the cable, the armoring and bearing means further guards the tube-like dielectric cylinder from abrasion and penetration; and means coaxially disposed about the armoring and bearing means for protecting it from the leaching action of seawater and to defocus externally originating concentrated forces, the tube-shaped solid conductor and the armoring and bearing means are selected from materials and dimensioned to provide a stress safety factor of about two in combination and, with the other means, to have a specific gravity of about one point five, the tube-shaped solid conductor and the armoring and bearing means are selected from materials that, when simultaneously strained a pretermined percent, share the load of the cable; further including means interposed in contact with the at least one optical fiber and within the tube-shaped solid conductor for buffering the at least one optical fiber to help isolate stress therefrom and the coaxial bore of the cylindrically-shaped solid conductor is sufficiently sized to receive the buffering means without any voids therein; the optically transmitting means is at least one optical fiber and the electrically transmitting means is a cylindrically-shaped solid conductor having a coaxial bore sized to receive the optically transmitting means and the buffering means to make a one-way d. c. path along the cable; the tube-like dielectric cylinder is a high density plyethylene; the armoring and bearing means is a multitude of aromatic polyamide filaments in an annular resin matrix; the tube-shaped solid conductor is fabricated from materials to share equally in the tensile load imposed by the cable when both the tube-shaped solid conductor and the aromatic polyamide filaments are strained to a one percent strain; the aromatic polyamide filaments are disposed in a contrahelix configuration with a relatively long lay length for torque balance; and the outer and inner diameters $D_3$ and $D_2$ of the tube-shaped solid conductor, the outer diameter of the tube-like dielctric cylinder $D_4$ and the outer diameter $D_5$ of the armoring and bearing means have the following relationship upon said one percent strain:

$$S(1\%) = (\pi/4)S_c(D_3^2 - D_2^2) + S_k(D_5^2 - D_4^2)$$

where $S_c$ is the tube-shaped solid conductor ultimate tensile stress at 1% strain of 4500 KGF/CM² and $S_k$ is the armor and bearing means tensile stress at 1% strain of 11250 KGF/CM².

2. An apparatus according to claim 1 in which the specific gravity of the armoring and bearing means is about one point four five to assure the stress safety factor of about two and specific gravity of about one point five.

3. An apparatus according to claim 2 in which the diameter $D_5$ of the armor and bearing means is less than one point six centimeters.

4. An apparatus according to claim 1, in which said one percent strain is maintained for a power delivered to instrumentation of between ten and two hundred fifty kilowatts with the outer diameter $D_6$ of the cable less than two point five centimeters.

* * * * *